US008653677B2

(12) United States Patent
West

(10) Patent No.: US 8,653,677 B2
(45) Date of Patent: Feb. 18, 2014

(54) ELECTROMAGNETIC, CONTINUOUSLY VARIABLE TRANSMISSION POWER SPLIT TURBO COMPOUND AND ENGINE AND VEHICLE COMPRISING SUCH A TURBO COMPOUND

(75) Inventor: Martin West, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 258 days.

(21) Appl. No.: 13/144,697

(22) PCT Filed: Jan. 12, 2010

(86) PCT No.: PCT/SE2010/000003
§ 371 (c)(1),
(2), (4) Date: Aug. 17, 2011

(87) PCT Pub. No.: WO2010/082893
PCT Pub. Date: Jul. 22, 2010

(65) Prior Publication Data
US 2012/0119509 A1 May 17, 2012

Related U.S. Application Data

(60) Provisional application No. 61/144,768, filed on Jan. 15, 2009.

(51) Int. Cl.
*H02K 7/18* (2006.01)
*H02K 16/00* (2006.01)
(52) U.S. Cl.
USPC ............................ 290/1 C; 310/103; 310/114
(58) Field of Classification Search
USPC .......... 290/1 C, 4 C; 310/103, 104, 105, 112, 310/114, 115; 475/5; 477/3, 4, 5, 6
See application file for complete search history.

(56) References Cited

U.S. PATENT DOCUMENTS 2,864,016 A * 12/1958 Waltscheff ................ 310/102 R
3,683,249 A * 8/1972 Shibata et al. ................ 318/730
(Continued)

FOREIGN PATENT DOCUMENTS

DE 3602543 A1 1/1986
GB 2457682 A 8/2009
(Continued)

OTHER PUBLICATIONS

Patent Abstracts of Japan JP Pub. No. 2005-273520, Oct. 6, 2005, Turbo Compound System, Hino Motors Ltd.
(Continued)

*Primary Examiner* — Tulsidas C Patel
*Assistant Examiner* — Viet Nguyen
(74) *Attorney, Agent, or Firm* — WRB-IP LLP

(57) ABSTRACT

An electromagnetic, continuously variable transmission power split turbo compound includes a turbo compound turbine driven by exhaust gases from an internal combustion engine, and a power split device comprising a magnetic gear arrangement. The magnetic gear arrangement includes a high speed rotor comprising a first quantity of permanent magnets, a low speed rotor comprising a second quantity of permanent magnets, and a plural pole rotor between the high speed rotor and the low speed rotor. A first rotor of the high speed rotor, the low speed rotor, and the plural pole rotor includes a mechanical input drive adapted to be driven by the turbine. A second rotor of the high speed rotor, the low speed rotor, and the plural pole rotor includes a mechanical output drive. A third rotor of the high speed rotor, the low speed rotor, and the plural pole rotor is unconnected to a mechanical drive and includes a controlling rotor for controlling a ratio of input drive angular velocity to output drive angular velocity.

29 Claims, 5 Drawing Sheets

(56) References Cited

U.S. PATENT DOCUMENTS

| | | | |
|---|---|---|---|
| 4,718,235 A | 1/1988 | Kawamura | |
| 4,798,257 A | 1/1989 | Kawamura et al. | |
| 4,850,193 A | 7/1989 | Kawamura | |
| 5,789,837 A * | 8/1998 | Shin et al. | 310/90.5 |
| 5,917,248 A * | 6/1999 | Seguchi et al. | 290/31 |
| 6,153,959 A * | 11/2000 | Lorenzo | 310/162 |
| 6,380,653 B1 | 4/2002 | Seguchi | 310/112 |
| 6,998,757 B2 * | 2/2006 | Seguchi et al. | 310/266 |
| 7,047,743 B1 | 5/2006 | Stahlhut et al. | |
| 7,174,714 B2 | 2/2007 | Algrain | |
| 7,382,061 B2 | 6/2008 | Ferraro | |
| 7,455,608 B2 * | 11/2008 | Moeller | 475/5 |
| 7,649,292 B2 * | 1/2010 | Moriya et al. | 310/114 |
| 7,723,886 B2 * | 5/2010 | Huber et al. | 310/102 R |
| 7,781,930 B2 * | 8/2010 | Abe et al. | 310/103 |
| 7,804,215 B2 * | 9/2010 | Hemmelmann et al. | 310/104 |
| 7,956,504 B2 * | 6/2011 | Quere | 310/114 |
| 8,125,095 B2 * | 2/2012 | Duffey et al. | 290/44 |
| 8,183,802 B2 * | 5/2012 | Quere | 318/269 |
| 8,188,633 B2 * | 5/2012 | Quere | 310/268 |
| 8,198,774 B2 * | 6/2012 | Takashima et al. | 310/156.43 |
| 8,288,916 B2 * | 10/2012 | Quere | 310/266 |
| 8,358,044 B2 * | 1/2013 | Waszak et al. | 310/103 |
| 2002/0041813 A1 | 4/2002 | Fledersbacher et al. | |
| 2004/0108781 A1 * | 6/2004 | Razzell et al. | 310/112 |
| 2006/0046894 A1 * | 3/2006 | Kyle | 477/3 |
| 2007/0096574 A1 * | 5/2007 | Romagny et al. | 310/112 |
| 2009/0072645 A1 * | 3/2009 | Quere | 310/114 |
| 2010/0219706 A1 * | 9/2010 | Watanabe et al. | 310/107 |
| 2011/0012458 A1 * | 1/2011 | Atallah et al. | 310/103 |
| 2011/0042965 A1 * | 2/2011 | Atallah et al. | 290/1 C |
| 2011/0057456 A1 * | 3/2011 | Atallah et al. | 290/1 C |
| 2011/0109179 A1 * | 5/2011 | Akutsu et al. | 310/77 |
| 2011/0115326 A1 * | 5/2011 | Clark et al. | 310/114 |
| 2011/0254279 A1 * | 10/2011 | Ventzke | 290/55 |
| 2011/0291511 A1 * | 12/2011 | Crocker | 310/114 |
| 2013/0134815 A1 * | 5/2013 | Powell et al. | 310/101 |

FOREIGN PATENT DOCUMENTS

| | | |
|---|---|---|
| WO | 2007125284 A1 | 12/2007 |
| WO | 2007144556 A1 | 12/2007 |
| WO | 2008075127 A1 | 6/2008 |
| WO | WO 2009087408 A2 * | 7/2009 |
| WO | 2009103994 A1 | 8/2009 |

OTHER PUBLICATIONS

Patent Abstracts of Japan JP Pub. No. 09-222026, Aug. 26, 1997, Control System for Turbocompound Engine, Hino Motors Ltd.
International Search Report for corresponding International App. PCT?SE2010/000003.
Powerpoint Presentation "Continuously Variable Magnetic Gear", Magnomatics.

* cited by examiner

ELECTROMAGNETIC, CONTINUOUSLY VARIABLE TRANSMISSION POWER SPLIT TURBO COMPOUND AND ENGINE AND VEHICLE COMPRISING SUCH A TURBO COMPOUND

BACKGROUND AND SUMMARY

The present invention relates generally to turbo compounds and, more specifically, to an electromagnetic, continuously variable transmission (CVT) power split turbo compound.

Mechanical turbo compound engines are well known, such as shown in U.S. Pat. No. 4,843,822, and generally include a power turbine placed in the exhaust gas stream, with a mechanical drive coupling through appropriate gear reduction and a fluid or spring coupling, driving the flywheel of the engine. In such turbo compound engines energy is recovered from the exhaust gas stream and re-applied to the engine output shaft reducing the brake specific fuel consumption, with the proviso that the rotational speed of the turbo compound is determined by the rotational speed of the engine (crankshaft). For a variety of reasons, it is desirable to be able to control the rotational speed of the power turbine independently of the engine's (crankshaft's) rotational speed.

Electric turbo compounds have been proposed as a solution to many of problems associated with mechanical turbo compounds. An electric turbo compound may include a high speed electrical generator connected directly to the power turbine, with associated power electronics either as a passive rectifier, or controlled inverter. Once the generated electrical power has been converted to DC (Direct Current) the electrical power may be stored or utilized immediately anywhere on the vehicle provided there is a suitable storage or electrical transmission. For the recuperated exhaust power to be utilized to drive the vehicle it must be reconverted to mechanical power.

While such a system may provide the advantages of variable turbo compound speed, it is at substantial cost in terms of system complexity and efficiency. As an example, a system dimensioned to allow the recuperation of 40 kW of exhaust energy and the application of the 100% of the recuperated energy to the crankshaft, would require a high-speed generator rated at 40 kW, power electronics associated with the conversion of the generated AC to DC rated at 40 kW, power electronics associated with the conversion of the intermediate DC to AC rated at 40 kW and an electric machine rated at 40 kW. The efficiency would also be reduced by each intermediate conversion.

By applying a power-split electric turbo compound, the majority of the power can be transmitted directly as in a mechanical turbo compound, with a minority portion of the recuperated energy being converted to electrical energy in such a manner that the turbo compound speed may be varied independently. In a power-split electric turbo compound, a Power Split Device (PSD) configuration is traditionally accomplished utilizing a mechanical epicyclic gear. Such systems tend to suffer from typical disadvantages of geared systems, such as the need for lubrication, gear wear, jamming, noise, vibration, etc. Moreover, gear ratios are constrained by the dimensions of the gears in the epicyclic gear. It is desirable to provide a system that can avoid some or all of these disadvantages.

In accordance with an aspect of the present invention, an electromagnetic, CVT power split turbo compound, comprises a turbo compound turbine driven by exhaust gases from an internal combustion engine, and a power split device comprising a magnetic gear arrangement. The magnetic gear arrangement comprises a high speed rotor comprising a first quantity of permanent magnets, a low speed rotor comprising a second quantity of permanent magnets, and a plural pole rotor between the high speed rotor and the low speed rotor. A first rotor of the high speed rotor, the low speed rotor, and the plural pole rotor comprises a mechanical input drive adapted to be driven by the turbine. A second rotor of the high speed rotor, the low speed rotor, and the plural pole rotor comprises a mechanical output drive. A third rotor of the high speed rotor, the low speed rotor, and the plural pole rotor is unconnected to a mechanical drive and comprises a controlling rotor for controlling a ratio of input drive angular velocity to output drive angular velocity.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
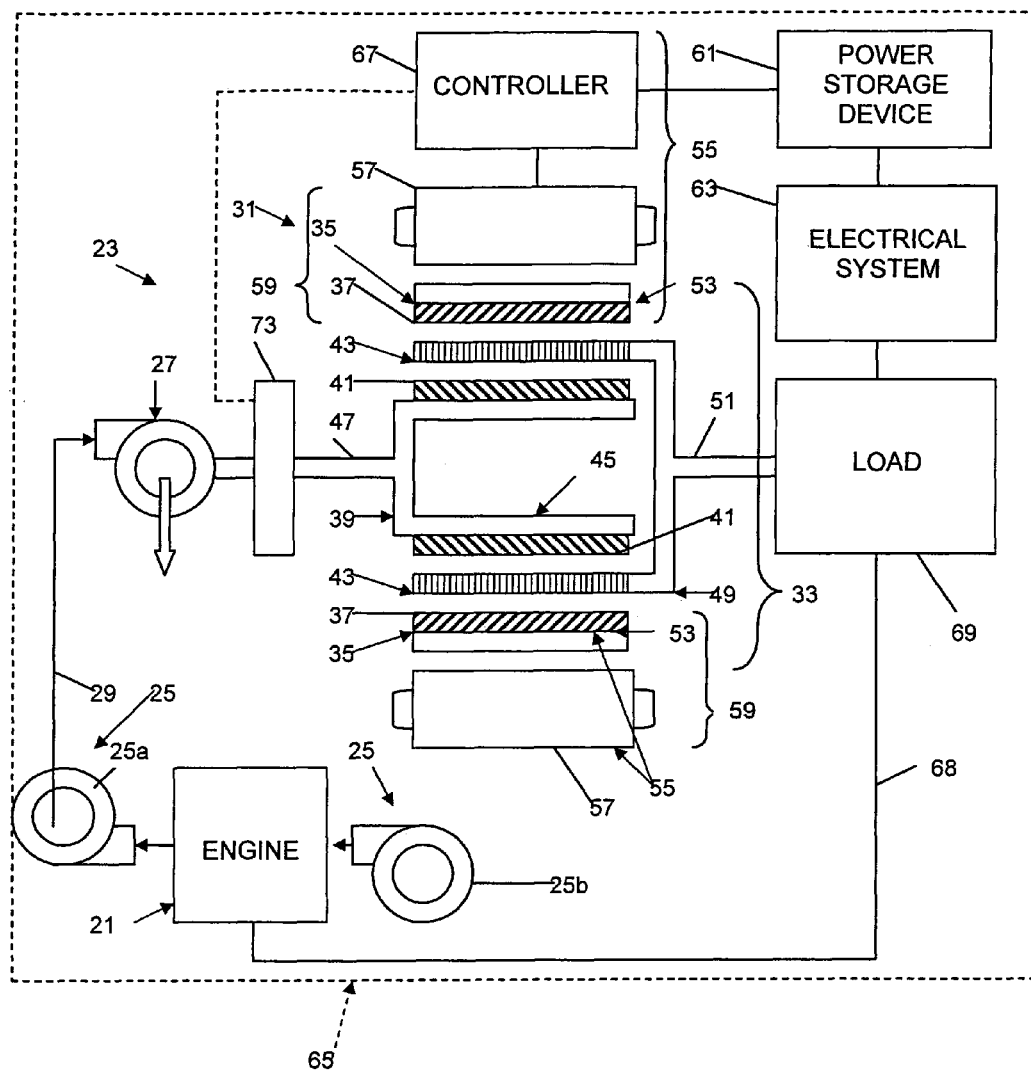
FIG. 1 is a side, schematic, partially cross-sectional view of a drive train of a vehicle comprising an internal combustion engine with an electromagnetic, CVT power split turbo compound according to an aspect of the present invention.

An internal combustion engine 21 comprising an electromagnetic, CVT power split turbo compound 23 is shown in FIG. 1. The engine 21 comprises a turbocharger 25 including a turbocharger turbine 25a and a turbocharger compressor 25b. However, the turbocharger 25 is optional. The turbo compound 23 comprises a power recovery turbine 27 (hereinafter "turbine", "turbo compound turbine" or the like) driven by exhaust gases from the engine 21. An exhaust conduit 29 connects the turbine 27 to the engine 21.

The turbo compound 23 further comprises a power split device 31 (PSD) comprising a magnetic gear arrangement 33. The magnetic gear arrangement 33 comprises a high speed rotor 35 (HSR) comprising a first quantity of permanent magnets 37, a low speed rotor 39 (LSR) comprising a second quantity of permanent magnets 41, and a plural pole rotor 43

(PPR) between the high speed rotor and the low speed rotor. The PPR 43 will ordinarily be designed to minimize eddy currents, such as by forming them from a laminated steel structure, or from a powdered metal material, often known as SMC, (Soft Magnetic Composite). International Patent Applications WO 2007/144556 and WO 2007/125284 disclose embodiments of magnetic gears suitable for use in connection with the magnetic gear arrangement 33 and are incorporated by reference.

While not wishing to be bound by theory, the basic principle of operation of magnetic gears of the type presently contemplated for use in connection with aspects of the present invention is that the magnetic field of one magnet rotor is coupled to the space harmonic created by the modulation of the magnetic field of the other magnet rotor by the pole piece rotor. As with mechanical epicyclic gears, a magnetic gear has a fixed ratio, from which one can determine other ratios at which the gear can be operated. With mechanical epicyclic gears, it is common to define the ratio of angular velocities between the Sun gear, and the Ring gear with the planet Carrier stationary. In the case of mechanical epicyclic gears the 'basic gear ratio', k is therefore:

$$\frac{\omega_S}{\omega_R} = -\frac{Z_S}{Z_R} \equiv k \text{ with } \omega_C \equiv 0, \quad (1)$$

where $\omega_S$, $\omega_R$, $\omega_C$ are the angular velocities of the Sun, Ring and Carrier respectively and $Z_S$, $Z_R$ are the number of teeth on the Sun and the Ring gear. By comparison with a mechanical epicyclic, a 'basic gear ratio' can also be defined for a magnetic gear transmission with the plural pole-rotor (also referred to as a Pole Piece Rotor) stationary. In the case of a magnetic gear the 'basic gear ratio' is therefore:

$$\frac{\omega_{HSR}}{\omega_{LSR}} = -\frac{P_{HSR}}{P_{LSR}} \equiv k \text{ with } \omega_{PPR} \equiv 0, \quad (2)$$

where $\omega_{HSR}$, $\omega_{LSR}$, $\omega_{PPR}$ are the angular velocities of the High Speed Rotor (HSR), Low Speed Rotor (LSR), and Plural Pole Rotor (PPR) respectively, and $P_{HSR}$, $P_{LSR}$ are the number of magnet pairs on the HSR and the LSR. The number of pole pairs, (a pair of N and S aligned magnet poles) on both the HSR and the LSR are fixed for any design, as are the number of pole pieces of the PPR. In the mechanical gear arrangement 33, all three elements are allowed to rotate, introducing two degrees of freedom. In such a configuration the ratio of angular velocities, between the HSR and the LSR and the PPR is given by the equation:

$$P_{HSR}\omega_{HSR} + P_{LSR}\omega_{LSR} = (P_{HSR} + P_{LSR})\omega_{PPR} \quad (3)$$

With three rotating elements and two degrees of freedom, and with one element connected to, e.g., an input shaft and one element is connected to, e.g., an output shaft, the ratio of input angular velocity to output angular velocity is determined by the 'basic gear ratio' and the speed of the remaining otherwise unconnected, "Controlling Rotor". The ratio of input angular velocity to output angular velocity or the "transmission ratio" is able to vary continuously.

The PSD 31 includes a first rotor 45 comprising a mechanical input drive 47 adapted to be driven by the turbine 27, a second rotor 49 comprising a mechanical output drive 51, and a third rotor 53 that is unconnected to a mechanical drive and comprising a controlling rotor for controlling a ratio of input drive angular velocity to output drive angular velocity. The magnetic gear 33 can be arranged with a variety of configurations, several of which are illustrated in FIGS. 1-9, so that the first rotor can be one, of the HSR, LSR, and PPR, the second rotor can be one of the HSR, LSR, and PPR, and the third rotor can be one of the HSR, LSR, and PPR. In the embodiment shown in FIG. 1, for purposes of discussion, the first rotor 45 is the LSR 39, the second rotor 49 is the PPR 43, and the third rotor 53 is the HSR 35. The mechanical input drive 47 and the mechanical output drive 51 are illustrated as axial connections, however, it will be appreciated that they can be axially offset connections, such as by providing appropriate gearing.

A control arrangement 55 is provided for controlling a speed of rotation of the third rotor 53 to thereby control the ratio of input drive angular velocity to output drive angular velocity which, for the embodiment of FIG. 1, is the ratio of angular velocity of the LSR 39, $\omega_{LSR}$, to the angular velocity of the PPR 43, $\omega_{PPR}$. The control arrangement 55 comprises a stator 57 and the third rotor 53. The third rotor 53 and the stator 57 form an electric machine 59 adapted to generate electrical power upon rotation of the third rotor relative to the stator, i.e., generate electrical power through delivery of mechanical power. The electrical power generated can be stored in a storage device such as a battery 61 or utilized to drive another machine, such as through a linkage to an existing electrical system such as the electrical system 63 in a vehicle 65 (schematically shown in phantom in FIG. 1) which may be, for example, a conventional vehicle with electrical components or a hybrid vehicle. The electric machine 59 will ordinarily also be able to function as a motor, i.e., generate mechanical power by causing rotation of one or more rotors upon delivery of electrical power to the electric machine from, e.g., an electrical power storage device 61.

The control arrangement 55 will ordinarily comprise a controller 67 for controlling the ratio of input drive angular velocity to output drive angular velocity by, e.g., controlling an amount of electrical power generated by the electric machine, including whether the electrical power generated is positive (e.g., generator operation) or negative (e.g., motor operation). The controller 67 will ordinarily comprise a computer such as an Electronic Control Unit (ECU) and may comprise other components that perform non-computational tasks. For example, the controller 67 might be required to control electrical current(s) in phase winding(s) of the electrical machine in such a way that the required torque is generated. This is normally achieved by power electronic devices controlled by a microcontroller in a way well-known to persons skilled in the art. The purpose of the power electronic devices is to control the flow of electrical power.

The engine 21 will ordinarily include or be coupled to (e.g., via a crankshaft or coupling 68) a load 69 such as a flywheel, etc., and the mechanical output drive 51 of the PSD 31 will ordinarily be linked to the load by any suitable linking arrangement, such as by fixed gearing. The controller 67 can be arranged to control delivery of electrical power, e.g., from the power storage device 61, to the electric machine 59 to, e.g., turn the crankshaft 68 via mechanical power generated by the electric machine. The mechanical input drive 47 may be prevented from rotating such as by providing a lock-up arrangement 73 between the mechanical input drive and the turbine. Such a lock-up arrangement 73 could be similar to a clutch system, or a friction break, or an interlocking element, e.g. a pin or pawl, actuated electromagnetically, hydraulically, pneumatically or mechanically. In this way, rotation of the first rotor 45 during start-up/engine cranking can be prevented so that the torque of the electrical machine 59 is applied to the crankshaft. If it is a controllable lock-up arrangement 73 controllable by the controller 67, (as indicated in FIG. 1 by the dotted line connecting the controllable lock-up arrangement 73 and the controller 67), it may also be beneficially activated during an engine braking mode. Instead of a controllable lock-up arrangement, a "freewheel" or ratchet-type connection between the mechanical input drive 47 and the turbine 27 might be used to prevent rotation of the first rotor 45 during start-up/engine cranking so that the torque of the electrical machine 59 is applied to the crankshaft 68.

While it is presently contemplated that most PSD 31 designs will ordinarily use the magnetic flux of either the HSR or LSR magnets as the third or controlling rotor 53 in the magnetic circuit of the controlling electric machine 59, it is also possible that the PPR could be used to control the transmission ratio. To use the PPR 43 as a controlling rotor would be conceptually equivalent to combining a conventional electric machine with a magnetic gear as a power split device, and would require a secondary magnetic circuit. Such a configuration is not, however, excluded, and the configuration of HSR 35, LSR 39, and PPR 43 is not limited to the configuration shown in FIG. 1, as is shown in FIGS. 2-7.

Figures 2, 3:
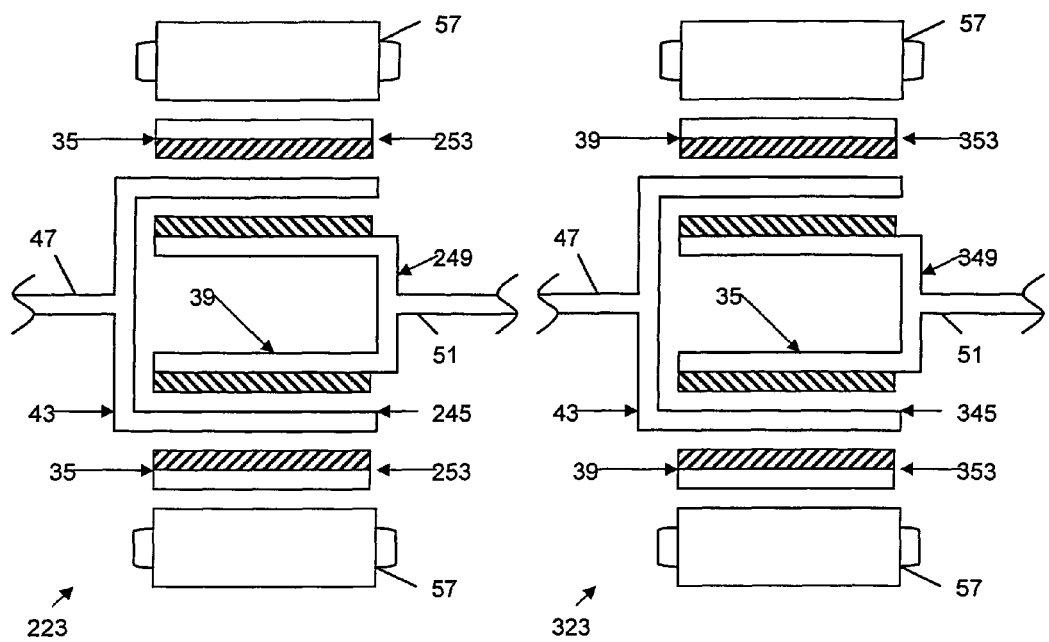
FIG. 2 is a side, schematic cross-sectional view of an electromagnetic, CVT power split turbo compound according to another aspect of the present invention.
FIG. 3 is a side, schematic cross-sectional view of an electromagnetic, CVT power split turbo compound according to another aspect of the present invention.
Figure 4:
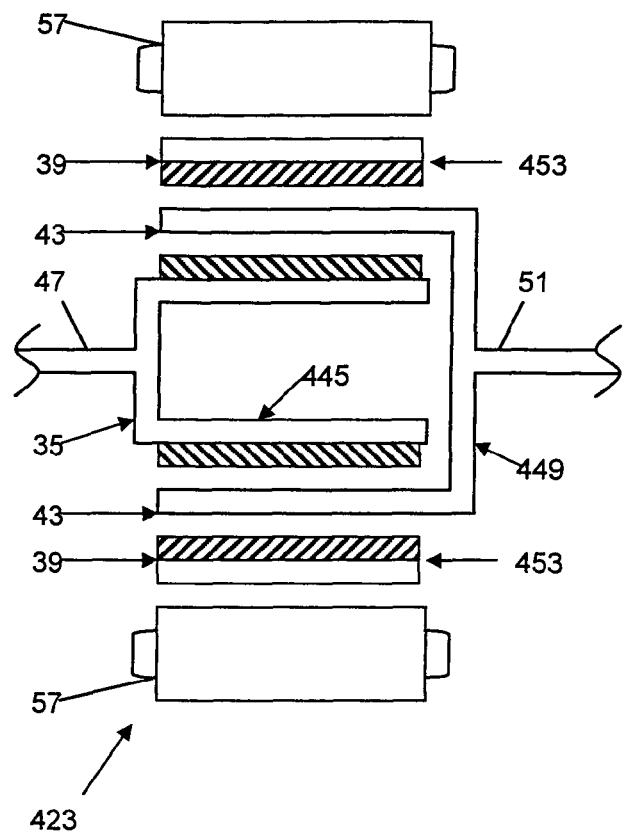
FIG. 4 is a side, schematic cross-sectional view of an electromagnetic, CVT power split turbo compound according to another aspect of the present invention.
Figure 5:
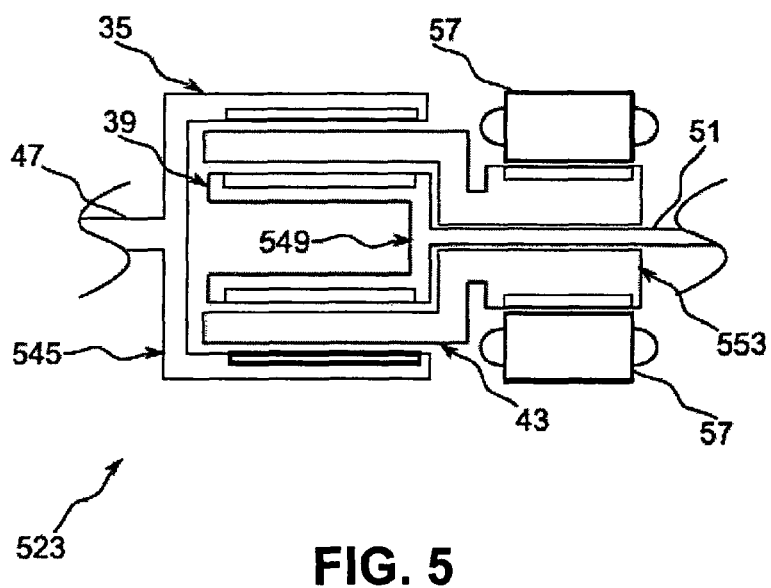
FIG. 5 is a side, schematic cross-sectional view of an electromagnetic, CVT power split turbo compound according to another aspect of the present invention.
Figure 6:
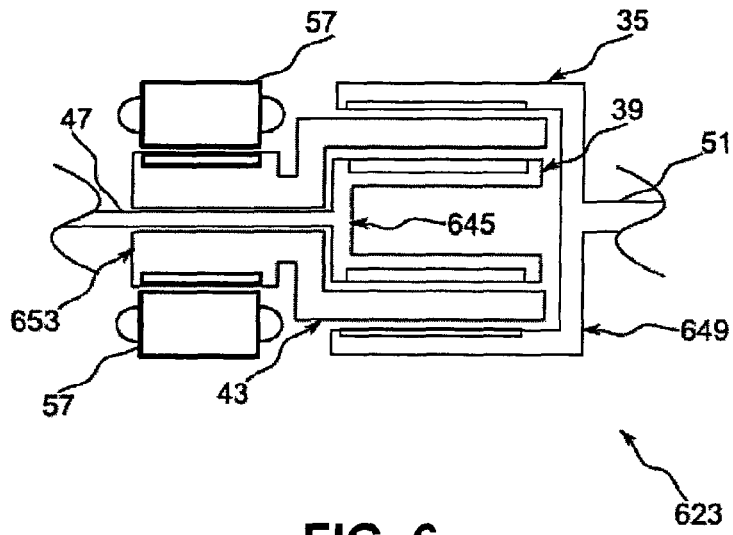
FIG. 6 is a side, schematic cross-sectional view of an electromagnetic, CVT power split turbo compound according to another aspect of the present invention.

- FIG. 2 shows a turbo compound 223 wherein the first rotor 245 is the PPR 43, the second rotor 249 is the LSR 39, and the third rotor 253 is the HSR 35.
- FIG. 3 shows a turbo compound 323 wherein the first rotor 345 is the PPR 43, the second rotor 349 is the HSR 35, and the third rotor 353 is the LSR 39.
- FIG. 4 shows a turbo compound 423 wherein the first rotor 445 is the HSR 35, the second rotor 449 is the PPR 43, and the third rotor 453 is the LSR 39.
- FIG. 5 shows a turbo compound 523 wherein the first rotor 545 is the HSR 35, the second rotor 549 is the LSR 39, and the third rotor 553 is the PPR 43.
- FIG. 6 shows a turbo compound 623 wherein the first rotor 645 is the LSR 39, the second rotor 649 is the HSR 35, and the third rotor 653 is the PPR 43.

In addition to serving different functions as the first rotor, the second rotor, or the third rotor in a given the PSD, the HSR 35, the LSR 39, and the PPR 41 can be arranged in a variety of different physical configurations. FIG. 2, for example, shows the HSR 35 as an outermost rotor of concentrically arranged first, second, and third rotors 245, 249, and 253, while FIG. 4 shows that the HSR 35 can be an innermost rotor of concentrically arranged first, second, and third rotors 445, 449, and 453.

Figures 7, 8:
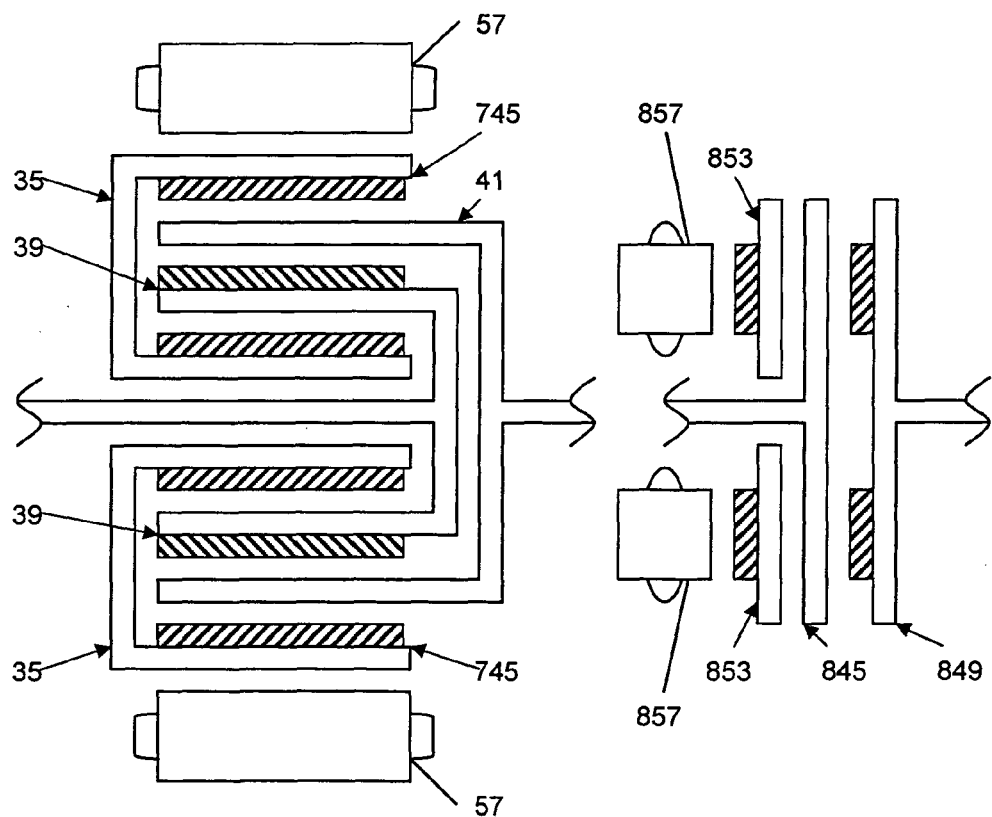
FIG. 7 is a side, schematic cross-sectional view of an electromagnetic, CVT power split turbo compound according to another aspect of the present invention.
FIG. 8 is a side, schematic cross-sectional view of an electromagnetic, CVT power split turbo compound according to another aspect of the present invention.

FIG. 7 shows that, where the HSR 35, the LSR 39, and the PPR 41 are arranged concentrically, the HSR 35 may be both radially interior of and radially exterior of the LSR 39. In this embodiment, the HSR 35 functions as a third rotor 745, and the LSR 39 can be either the first or the second rotor.

In the embodiments shown in, e.g., FIG. 1, a flux path between the first rotor 45 and the second rotor 49 (and between the first, second, and third rotors 45, 49, and 53) extends radially relative to an axis of rotation of the first rotor and the second rotor. FIG. 8 shows an arrangement wherein a flux path between the first rotor 845 and the second rotor 849 (and between the first, second, and third rotors 845, 849, and 853) extends axially relative to an axis of rotation of the first rotor and the second rotor.

Figure 9:
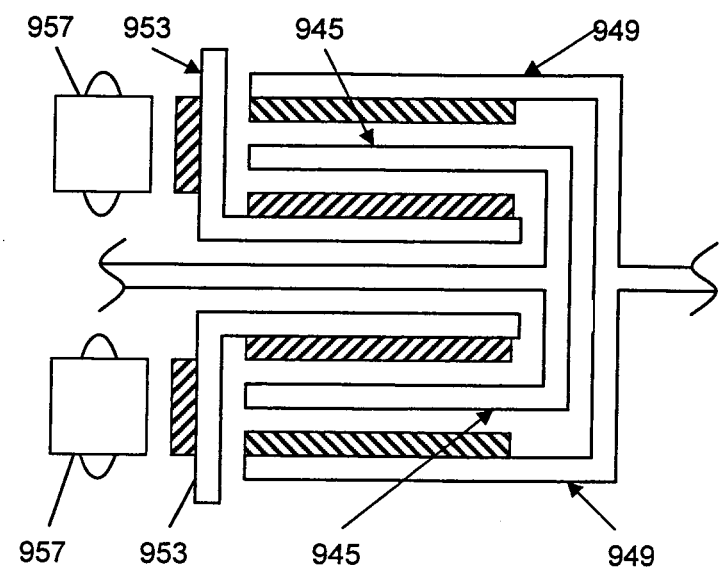
FIG. 9 is a side, schematic cross-sectional view of an electromagnetic, CVT power split turbo compound according to another aspect of the present invention.

In the embodiments shown in, e.g., FIG. 1, a flux path between the first rotor 45 and the second rotor 49 extends radially relative to an axis of rotation of the first rotor and the second rotor, and a flux path between the third rotor 53 and the stator 57 extends radially relative to the axis of rotation of the first rotor and the second rotor. FIG. 8 shows an embodiment wherein a flux path between the first rotor 845 and the second rotor 849 extends axially relative to an axis of rotation of the first rotor and the second rotor, and a flux path between the third rotor 853 and the stator 857 extends axially relative to the axis of rotation of the first rotor and the second rotor. FIG. 9 shows an embodiment wherein a flux path between the first rotor 945 and the second rotor 949 extends radially relative to an axis of rotation of the first rotor and the second rotor, and a flux path between the third rotor 953 and the stator 957 extends axially relative to the axis of rotation of the first rotor and the second rotor.

There are a variety of advantages available in utilizing a CVT in a turbo compound according to aspects of the present invention. For example, with an independent power turbine 27, the speed of the turbine can be optimized with regards to low fuel consumption for the engine 21. At low engine loads the turbo compound can be controlled to idle and a higher amount of exhaust energy can be recovered compared to a turbine with a fixed rotational speed. At high engine loads and low engine speed the turbo compound can be run at a more optimal speed to increase the exhaust energy recovery.

To illustrate, in a particular design of a power turbine and engine, at low engine loads and high engine speeds the optimal amount of power might be extracted from the exhaust gas by the power turbine when it is operating at approximately 20 times the rotational velocity of the crankshaft. At high engine loads and low engine speeds the optimal amount of power might be extracted from the exhaust gas by the power turbine when it is operating at approximately 90 times the rotational velocity of the crankshaft. The range of ratios given above, 20:1 to 90:1, are specific to one particular design of power turbine and engine, and will vary for different designs of power turbines and engines. However the advantage over selecting a fixed gear ratio between turbine and crankshaft can be seen. If a fixed gear ratio is chosen in between the minimum and maximum ideal ratios, when the engine is at high loads and low speeds the power turbine will be operating below the speed at which the maximum system efficiency is achieved. Conversely at low loads and high engine speeds the power turbine will be operating above the speed at which the maximum system efficiency is achieved.

Another advantage available through aspects of the present invention relates to the possibility of recuperating (as turbo compound turbine power) some of the increased engine pumping loss that occurs when increasing the exhaust back pressure in order to increase the EGR amount. For example, a four stroke engine must do work to evacuate the exhaust gas from the cylinder during the exhaust stroke. When more re-circulated exhaust gas is required, (e.g. for emissions control) the back pressure against which the engine works during the exhaust stroke increases, thus the engine does more work on the exhaust gas, which is normally lost. With a turbo compound, in which the turbine speed is decoupled from the crankshaft speed, a larger proportion of the pumping work done on the exhaust gas can be recovered, by controlling the speed of the controlling rotor such that the optimal turbine speed is obtained even during transients.

Another advantage available through aspects of the present invention relates to improved acceleration by increasing the speed of a variable turbo compound in order to increase the pressure drop over the turbo charger, and thereby to reduce turbo lag, i.e., the delay before the turbo charger is able to provide the desired intake pressure. The turbocharger's compressor is driven by the turbocharger's turbine, up-stream of the turbo compound in the exhaust flow. The power applied compressing the intake charge is dependent on the power extracted from the exhaust gas by the turbocharger's turbine. The power provided to the intake compressor, and therefore the turbo lag, is therefore dependent on the pressure difference across the turbocharger turbine, and therefore turbo lag can be improved (reduced) by increasing the pressure drop.

By using a magnetic gear PSD, various advantages are available including no gear wear, inherent overload protection, no jamming, physical and electrical isolation between shafts, no need for lubrication, reduced maintenance and improved reliability, reduced noise/vibration, removal of the need for expensive fluid coupling. By using a magnetic gear PSD, still further advantages are available including physical and electrical isolation between shafts. Physical isolation may be advantageous as the transmission can operate through a membrane, such that fluids, e.g., lubricants or gasses may be separated from one side of the transmission to the other. Electrical isolation may be advantageous in faulted conditions. It also may be advantageous in reducing parasitic circulating currents, often called bearing-currents which can cause premature failing of bearings.

Further, integration of a magnetic circuit of the gear with an electric machine can massively reduces system packaging volume. Unlike a mechanical epicyclic, gear ratios of the magnetic gear PSD are not constrained by the dimensions of the gears and the gear can be effectively "turned inside out" with the inner shaft either faster or slower than the outer shaft.

Using an electromagnetic CVT power split turbo compound offers advantages including a reduction in the rating of electrical components as only the controlling fraction of the rated power need be converted to electrical power and then back. The electromagnetic CVT split turbo compound can have higher efficiency as only the controlling fraction of power is converted to electrical power and then back through lossy conversions. Design complexity can be reduced because, for example, utilizing the gearing effect to best advantage can allow the rated speed of the electric machine to be placed in a suitable range, allowing easy, and efficient control of it, a reduction in iron losses, etc.

Using an electromagnetic CVT power split turbo compound can also result in a substantial reduction in the cost of power electronic conversion components. There can also be a reduction in system cost and complexity. As only a fraction of the system power is converted to electrical power, the need for expensive "mild hybrid" system costs are possibly removed all together. For example, of a 40 kW turbo compound system, the fraction of power required for controlling the variable gear ratio could be in the order of 10 kW. The controlling fraction which is generated electrically could be utilized in the existing vehicle electrical architecture, possibly replacing the alternator further reducing system cost and increasing efficiency.

A system according to an aspect of the present invention may avoid all of the costs associated with converting electrically generated power flow back to a propulsive power flow, if the vehicle electrical architecture is suitably configured. As an example, other engine ancillaries such as cooling fans may be driven electrically, increasing their efficiency, instead of returning the power to the crankshaft.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An electromagnetic, continuously variable transmission power split turbo compound, comprising:
a turbo compound turbine driven by exhaust gases from an internal combustion engine; and
a power split device comprising a magnetic gear arrangement, the magnetic gear arrangement comprising a high speed rotor comprising a first quantity of permanent magnets, a low speed rotor comprising a second quantity of permanent magnets, and a plural pole rotor between the high speed rotor and the low speed rotor,
a first rotor of the high speed rotor, the low speed rotor, and the plural pole rotor comprising a mechanical input drive adapted to be driven by the turbine,
a second rotor of the high speed rotor, the low speed rotor, and the plural pole rotor comprising a mechanical output drive, and
a third rotor of the high speed rotor, the low speed rotor, and the plural pole rotor being unconnected to a mechanical drive and comprising a controlling rotor for controlling a ratio of input drive angular velocity to output drive angular velocity.

2. The electromagnetic, continuously variable transmission power split turbo compound as set forth in claim 1, comprising a control arrangement for controlling a speed of rotation of the third rotor to thereby control the ratio of input drive angular velocity to output drive angular velocity.

3. The electromagnetic, continuously variable transmission power split turbo compound as set forth in claim 2, wherein the control arrangement comprises a stator, the third rotor and the stator forming, an electric machine adapted to generate electrical power upon rotation of the third rotor relative to the stator.

4. The electromagnetic, continuously variable transmission power split turbo compound as set forth in claim 1, comprising a stator and a controller, the stator and the third rotor forming an electric machine adapted to generate electrical power upon rotation of the third rotor relative to the stator, the controller controlling the ratio of input drive angular velocity to output, drive angular velocity by controlling an amount electrical power generated by the electric machine.

5. The electromagnetic, continuously variable transmission power split turbo compound as set forth in claim 4, comprising an electrical power storage device connected to the electric machine so that electrical power generated by the electric machine is stored in the electrical power storage device.

6. The electromagnetic, continuously variable transmission power split turbo compound as set forth in claim 5, wherein the controller is arranged to control the electric machine to generate mechanical power upon delivery of electrical power to the electrical machine from the electrical power storage device.

7. An internal combustion engine comprising the electromagnetic, continuously variable transmission power split turbo compound as set forth in claim 6, the internal combustion engine comprising a crankshaft, the mechanical output drive of the power shift device being linked to the crankshaft and the controller being arranged to control delivery of electrical power to the electrical machine to turn the crankshaft via mechanical power generated by the electrical machine.

8. The internal combustion engine as set forth in claim 7, wherein the mechanical input drive is connectable to and disconnectable from the turbine under control of the controller.

9. The electromagnetic, continuously variable transmission power split turbo compound as set forth in claim 1, wherein the first rotor is the plural pole rotor.

10. The electromagnetic, continuously variable transmission power split turbo compound as set forth in claim 9, wherein the second rotor is the low speed rotor.

11. The electromagnetic, continuously variable transmission power split turbo compound as set forth in claim 9, wherein the second rotor is the high speed rotor.

12. The electromagnetic, continuously variable transmission power split turbo compound as set forth in claim 1, wherein the first rotor is the high speed rotor.

13. The electromagnetic, continuously variable transmission power split turbo compound as set forth in claim 12, wherein the second rotor is the plural pole rotor.

14. The electromagnetic, continuously variable transmission power split turbo compound as set forth in claim 12, wherein the second rotor is the low speed rotor.

15. The electromagnetic, continuously variable transmission power split turbo compound as set forth in claim 1, wherein the first rotor is the low speed rotor.

16. The electromagnetic, continuously variable transmission power split turbo compound as set forth in claim 15, wherein the second rotor is the plural pole rotor.

17. The electromagnetic, continuously variable transmission power split turbo compound as set forth in claim 15, wherein the second rotor is the high speed rotor.

18. The electromagnetic, continuously variable transmission power split turbo compound as set forth in claim 1, wherein the high speed rotor is an outermost rotor of concentrically arranged first, second, and third rotors.

19. The electromagnetic, continuously variable transmission power split turbo compound as set forth in claim 1, wherein the high speed rotor is an innermost rotor of concentrically arranged first, second, and third rotors.

20. The electromagnetic, continuously variable transmission power split turbo compound as set forth in claim 1, wherein a flux path between the first rotor and the second rotor extends radially relative to an axis of rotation of the first rotor and the second rotor.

21. The electromagnetic, continuously variable transmission power split turbo compound as set forth in claim 1, wherein a flux path between the first rotor and the second rotor extends axially relative to an axis of rotation of the first rotor and the second rotor.

22. The electromagnetic, continuously variable transmission power split turbo compound as set forth in claim 1, comprising a stator, the third rotor and the stator forming an electric machine adapted to generate electrical power upon rotation of the third rotor relative to the stator.

23. The electromagnetic, continuously variable transmission power split turbo compound as set forth in claim 22, wherein a flux path between the first rotor and the second rotor extends radially relative to an axis of rotation of the first rotor and the second rotor.

24. The electromagnetic, continuously variable transmission power split turbo compound as set forth in claim 23, wherein a flux path between the third rotor and the stator extends radially relative to the axis of rotation of the first rotor and the second rotor.

25. The electromagnetic, continuously variable transmission power split turbo compound as set forth in claim 23, wherein a flux path between the third rotor and the stator extends axially relative to the axis of rotation of the first rotor and the second rotor.

26. The electromagnetic, continuously variable transmission power split turbo compound as set forth in claim 22, wherein a flux path between the first rotor and the second rotor extends axially relative to an axis of rotation of the first rotor and the second rotor.

27. The electromagnetic, continuously variable transmission power split turbo compound as set forth in claim 26, wherein a flux path between the third rotor and the stator extends radially relative to the axis of rotation of the first rotor and the second rotor.

28. The electromagnetic, continuously variable transmission power split turbo compound as set forth in claim 16, wherein a flux path between the third rotor and the stator extends axially relative to the axis of rotation of the first rotor and the second rotor.

29. An internal combustion engine comprising the electromagnetic, continuously variable transmission power split turbo compound as set forth in claim 1.

* * * * *